(12) United States Patent
Qu et al.

(10) Patent No.: US 12,483,380 B2
(45) Date of Patent: *Nov. 25, 2025

(54) KALMAN FILTER BASED PHASE-LOCKED LOOP WITH RE-ENCODING BASED PHASE DETECTOR

(71) Applicant: Silicon Laboratories Inc., Austin, TX (US)

(72) Inventors: Xushuai Qu, Austin, TX (US); Guner Arslan, Austin, TX (US); Robert Gorday, Gainesville, FL (US); Yan Zhou, Spicewood, TX (US); Yi Shen Yeh, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/392,416

(22) Filed: Dec. 21, 2023

(65) Prior Publication Data

US 2025/0088345 A1    Mar. 13, 2025

Related U.S. Application Data

(63) Continuation-in-part of application No. 18/243,222, filed on Sep. 7, 2023.

(51) Int. Cl.
*H04L 7/033* (2006.01)
*H03M 13/00* (2006.01)
*H03M 13/41* (2006.01)

(52) U.S. Cl.
CPC .......... *H04L 7/0334* (2013.01); *H03M 13/41* (2013.01); *H03M 13/6511* (2013.01)

(58) Field of Classification Search
CPC ............ H04L 7/0334; H04L 2027/003; H04L 2027/0055; H04L 2027/0067;
(Continued)

(56) References Cited

U.S. PATENT DOCUMENTS

| | | | |
|---|---|---|---|
| 5,285,480 A | * | 2/1994 | Chennakeshu ... H04L 25/03038 708/319 |
| 5,353,307 A | | 10/1994 | Lester et al. |

(Continued)

OTHER PUBLICATIONS

Bluetooth®, "Low Energy Controller," Specification of the Bluetooth® System, vol. 6, Covered Core Package Version: 5.4, Version Date Jan. 31, 2023, 437 pages.
(Continued)

*Primary Examiner* — Jean B Corrielus
(74) *Attorney, Agent, or Firm* — Zagorin Cave LLP

(57) ABSTRACT

A wireless communications device includes a receiver having a phase detector configured to extract frequency offset and provide a corresponding error signal generated based on a baseband version of a received radio frequency signal and an expected transmitted data signal. The receiver has a phase-locked loop configured to generate an error correction signal based on a phase of the error signal and a predicted instantaneous phase of the error signal. The receiver has a correction circuit configured to provide a corrected baseband version of the received radio frequency signal based on the baseband version of the received radio frequency signal and the error correction signal. The receiver may have a re-encoding-based processing circuit configured to provide the expected transmitted data signal based on a preliminarily decoded symbol.

20 Claims, 14 Drawing Sheets

(58) Field of Classification Search
CPC .. H03M 13/41; H03M 13/6511; H03M 13/23; H03M 13/33; H03M 13/336
See application file for complete search history.

(56) References Cited

U.S. PATENT DOCUMENTS

| | | | |
|---|---|---|---|
| 6,314,147 B1 | 11/2001 | Liang et al. | |
| 7,630,462 B1* | 12/2009 | Lou | H04L 1/0054 375/341 |
| 2003/0053564 A1* | 3/2003 | Kim | H04L 27/2676 375/376 |
| 2005/0286622 A1 | 12/2005 | Kim et al. | |
| 2007/0041434 A1* | 2/2007 | Park | H04H 20/06 375/211 |

OTHER PUBLICATIONS

Massachusetts Institute of Technology, "Viterbi Decoding of Convolutional Codes," 6.02 Lecture 9, Mar. 8, 2010, 9 pages.
Massachusetts Institute of Technology, "Introduction to EECS II Digital Communications Systems," 6.02 Lecture 7, Fall 2012, downloaded Nov. 16, 2023, 20 pages.
Patapoutian, A., "Phase-Locked Loops and Kalman Filters," IEEE Transactions on Communications, vol. 47, No. 5, May 1999, 3 pages.
Cao, X., et al., "Simplified LLR Algorithm for M-QAM Demodulation," The Journal of Engineering, Oct. 9, 2019, vol. 2019, Issue 21, pp. 7370-7375.
Mueller, K., and Müller, M., Timing Recovery in Digital Synchronous Data Receivers, IEEE Transactions on Communications, vol. Com-24, No. 5, May 1976, pp. 516-531.
Rice, M., "Digital Communications: A Discrete-Time Approach," Jan. 1, 2009, Chapter 8, Sections 8.4 and 8.5, pp. 459-497, Pearson Prentice Hall, Upper Saddle River, USA.

* cited by examiner

```
1   for each state s_k:
2       compute branch metrics of m branches:
            $B(m) = \sum_{n=1}^{N} |vi_{kn} - x_{kn}^m|^2$;
3       find $B_{min} = \min(B(m))$;
4       compute path metrics (accumulated metrics) to state $s_k$:
            $P(s_k) = P(s_{k-1}^s) + B_{min}$;
5       store $\hat{u}_k(s_k), P(s_k)$;
6   end;
7   
8   if($k \geq TL$)
9       if($k! = L$)
10          find $s_k^{min} = \min_{s_k} P(s_k)$;
11          traceback the path that reaches to $s_k^{min}$ to find $\hat{u}_{k-TL}(s_{k-TL}^{TB})$;
12          assign output $vo[k] = \hat{u}_{k-TL}(s_{k-TL}^{TB})$;
13      else
14          assign output $vo[k:k+TL] = [\hat{u}_{k-TL}(s_{k-TL}^{TB}), \hat{u}_{k-TL+1}(s_{k-TL+1}^{TB}), ..., \hat{u}_k(s_k^{min})]$.
15      end;
16  end;
```

1. for each state $s_k$
2.    compute branch metrics of m branches:
3.       $B(m) = \sum_{n=1}^{N} |y_{kn} - x_{kn}^m|^2$;
4.    find $B_{min} = \min(B(m))$;
5.    compute path metrics (accumulated metrics) to state $s_k$:
6.       $P(s_k) = P(s_{k-1}^s) + B_{min}$;
7.    store $\hat{u}_k(s_k), P(s_k)$;
8. end;
9. 
10. find $s_k^{min} = \min_{s_k} P(s_k)$;
11. assign preliminary output $voi[k] = \hat{u}_k(s_k^{min})$;
12. 
13. if($k \geq TL$)
14.    if($k! = L$)
15.       traceback the path that converges to $s_k^{min}$ to find $\hat{u}_{k-TL}(s_{k-TL}^{TB})$;
16.       assign output $vo[k] = \hat{u}_{k-TL}(s_{k-TL}^{TB})$;
17.    else
18.       assign output $vo[k:k+TL] = [\hat{u}_{k-TL}(s_{k-TL}^{TB}), \hat{u}_{k-TL+1}(s_{k-TL+1}^{TB}), ..., \hat{u}_k(s_k^{min})]$;
19.    end;
20. end;

FIG. 13D

KALMAN FILTER BASED PHASE-LOCKED LOOP WITH RE-ENCODING BASED PHASE DETECTOR

CROSS-REFERENCE TO RELATED APPLICATION(S)

This application is a continuation-in-part of co-pending patent application Ser. No. 18/243,222, filed on Sep. 7, 2023, entitled "Kalman Filter Based Phase-Locked Loop for Phase-Shift Keying Quadrature Amplitude Modulated Signals" naming Xushuai Qu et al. as inventors, which application is hereby incorporated by reference.

BACKGROUND

Field of the Invention

This disclosure relates to communications systems in general, and more particularly to radio frequency (RF) communications systems with frequency and phase offset estimation and compensation.

Description of the Related Art

In a typical wireless communications system, coherent reception requires that the frequency and phase of a local oscillator at a receiving wireless communications device be identical to the frequency and phase of the carrier wave generated at the transmitting wireless communications device. That is, the difference in phase (i.e., phase offset) and difference in frequency (i.e., frequency offset) between the local oscillator of the receiver and the carrier wave generated using a remote oscillator at a transmitter, should be zero. Noise or any frequency offset or frequency drift between the local oscillator of the receiving wireless communications device and a frequency of a remote oscillator of a transmitting wireless communications device can introduce error into recovered data or measurements (e.g., High Accuracy Distance Measurements) based on the received signal. Accordingly, techniques that reduce or eliminate effects of frequency or phase offset at a receiving wireless communications device are desired.

SUMMARY OF EMBODIMENTS OF THE INVENTION

A method for tracking frequency and phase offset in a receiver includes computing an error signal based on a baseband version of a received radio frequency signal and a reference signal. The method includes generating an error correction signal based on a phase of the error signal and a predicted instantaneous phase signal. The method includes providing a corrected baseband version of the received radio frequency signal based on the baseband version of the received radio frequency signal and the error correction signal. The method may include generating the reference signal. In a training mode of operation of the receiver, the reference signal may be generated based on predetermined samples. In a tracking mode of operation of the receiver, the reference signal may be generated using a decoded symbol based on the corrected baseband version of the received radio frequency signal. The method may include processing the corrected baseband version of the received radio frequency signal using a modified Viterbi decoder and generating the reference signal based on a preliminarily decoded symbol provided by the modified Viterbi decoder. The method may further include providing a decoded symbol based on soft-decision symbols of the corrected baseband version of the received radio frequency signal and on first path metrics for a sequence of states having a traceback length TL. The method may further include providing the preliminarily decoded symbol by the modified Viterbi decoder based on at least one soft-decision symbol of the corrected baseband version of the received radio frequency signal and on second path metrics for a preliminary set of states. The modified Viterbi decoder has a preliminary traceback length PTL, where PTL and TL are integers, and 0≤PTL<TL. The method may include providing the preliminarily decoded symbol by the modified Viterbi decoder at time index k based on a soft-decision symbol of the corrected baseband version of the received radio frequency signal at the time index k. The modified Viterbi decoder may have a plurality of states, each of the plurality of states may have a corresponding accumulated path metric, and the preliminarily decoded symbol may correspond to a state of the plurality of states having a minimum accumulated path metric at the time index k.

In at least one embodiment, a wireless communications device includes a receiver having a phase detector configured to extract frequency offset and provide a corresponding error signal generated based on a baseband version of a received radio frequency signal and an expected transmitted data signal. The receiver has a phase-locked loop configured to generate an error correction signal based on a phase of the error signal and a predicted instantaneous phase of the error signal. The receiver has a correction circuit configured to provide a corrected baseband version of the received radio frequency signal based on the baseband version of the received radio frequency signal and the error correction signal. The receiver may have a re-encoding-based processing circuit configured to provide the expected transmitted data signal based on a preliminarily decoded symbol. The receiver may have a modified Viterbi decoder having a preliminary traceback length of PTL and a traceback length TL. The modified Viterbi decoder may be configured to provide the preliminarily decoded symbol based on at least soft-decision symbols of the corrected baseband version of the received radio frequency signal and on path metrics for a preliminary set of states, where PTL and TL are integers, and 0≤PTL<TL. The receiver may include a modified Viterbi decoder configured to provide the preliminarily decoded symbol at time index k based on a soft-decision symbol of the corrected baseband version of the received radio frequency signal at the time index k. The modified Viterbi decoder may have a plurality of states. Each of the plurality of states may have a corresponding accumulated path metric. The preliminarily decoded symbol may correspond to a state of the plurality of states having a minimum accumulated path metric at the time index k.

In at least one embodiment, a method for recovering data transmitted using a radio frequency signal includes generating a recovered signal based on error between a reference signal and a baseband version of a received radio frequency signal. The method includes generating the reference signal using a preliminarily decoded symbol provided by a modified Viterbi decoder. The method may include providing a plurality of decoded symbols based on soft-decision symbols of the recovered signal and on first path metrics for a sequence of states having a traceback length TL. The method may include providing at least one preliminarily decoded symbol by the modified Viterbi decoder based on at least one soft-decision symbol of the recovered signal and on second path metrics for a preliminary set of states. The modified Viterbi decoder has a preliminary traceback length PTL, where PTL and TL are integers, and 0≤PTL<TL. The method may include providing the preliminarily decoded symbol by the modified Viterbi decoder at time index k based on a soft-decision symbol of the recovered signal at the time index k. The modified Viterbi decoder may have a plurality of states. Each of the plurality of states may have a corresponding accumulated path metric. The preliminarily decoded symbol may correspond to a state of the plurality of states having a minimum accumulated path metric at the time index k.

BRIEF DESCRIPTION OF THE DRAWINGS

The present invention may be better understood, and its numerous objects, features, and advantages made apparent to those skilled in the art by referencing the accompanying drawings.

FIG. 13C illustrates pseudocode for a conventional Viterbi decoder.

FIG. 13D illustrates pseudocode for a modified Viterbi decoder consistent with various embodiments of the invention.

The use of the same reference symbols in different drawings indicates similar or identical items.

DETAILED DESCRIPTION

Figure 1:
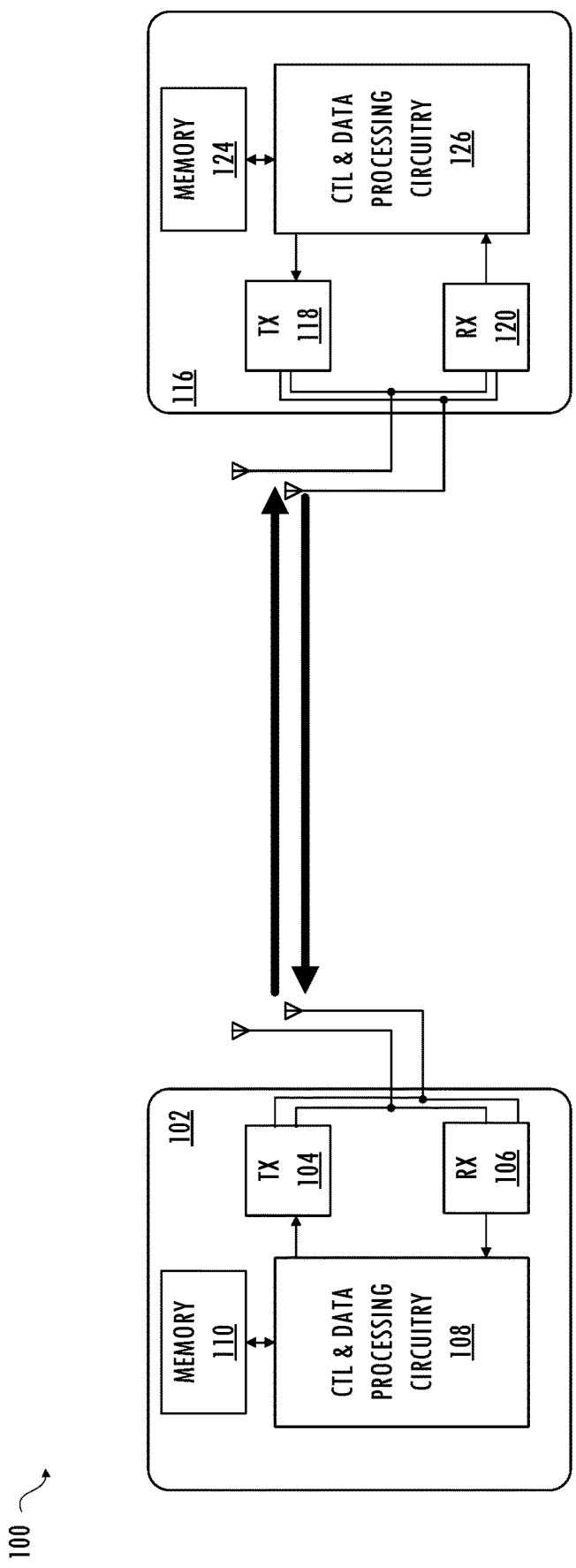
FIG. 1 illustrates a functional block diagram of an exemplary wireless communications system.

Referring to FIG. 1, in at least one embodiment, wireless communications system 100 includes wireless communications device 102 and wireless communications device 116, which are devices compliant with the Bluetooth® Low Energy (BLE) communications protocol or BLE High Data Throughput (BLE HDT) communications protocol designed for low power and low latency applications. Wireless communications device 102 includes transmitter 104, receiver 106, control & data processing circuitry 108, and memory 110. Wireless communications device 116 includes transmitter 118, receiver 120, control & data processing circuitry 126, and memory 124. Although wireless communications device 102 and wireless communications device 116 are illustrated as each including only one transmitter, one receiver, and two antennas, in other embodiments of wireless communications system 100, wireless communications device 102 or wireless communications device 116 includes multiple transmitters, multiple receivers, additional antennas, or a single antenna with internal circuitry selection or radio frequency switches. Wireless communications system 100 can communicate information using a predetermined wireless communications protocol, e.g., data using BLE communications protocol or BLE HDT communications protocol. However, in other embodiments, wireless communications system 100 can transmit and receive data compliant with other wireless communications protocols.

Figure 2:
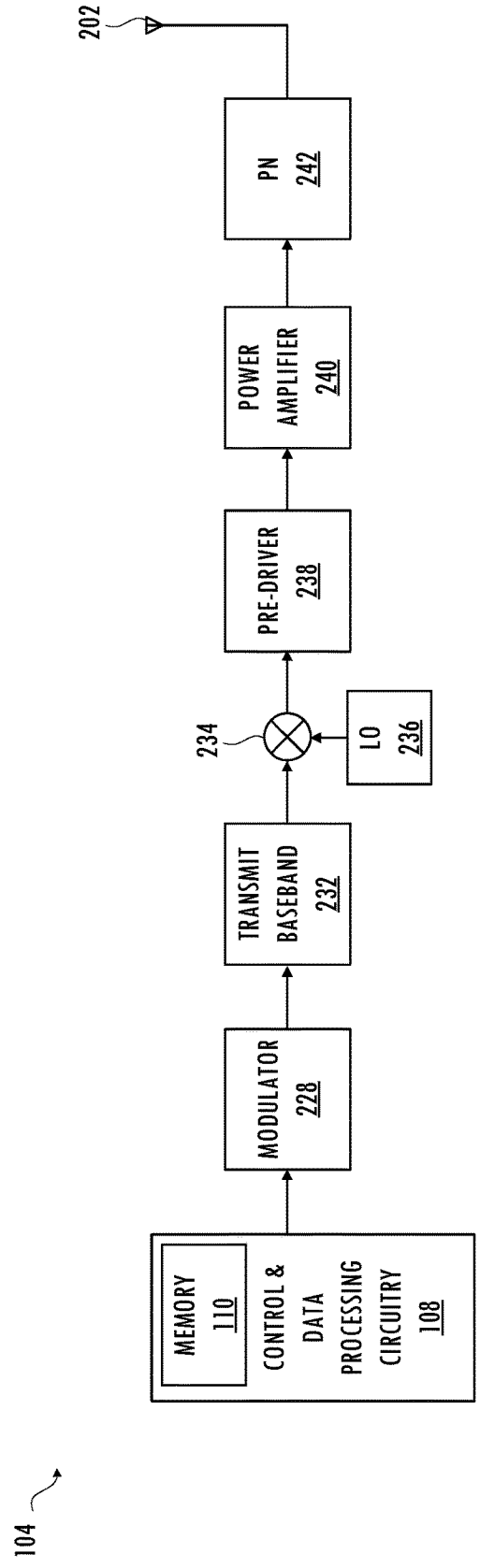
FIG. 2 illustrates a functional block diagram of the exemplary wireless communications transmitter of FIG. 1.

FIG. 2 illustrates an exemplary embodiment of transmitter 104 that may be included in a physical radio of wireless communications device 102 or wireless communications device 116 of FIG. 1. Control & data processing circuitry 108 of FIG. 2 may perform a variety of functions (e.g., logic, arithmetic, etc.). For example, data processing circuitry 108 executes a program, routine, or algorithm (whether in software, firmware, hardware, or a combination thereof) that performs desired control or data processing tasks consistent with a physical layer of a communications protocol and provides data to modulator 228. Modulator 228 applies a predetermined modulation scheme (e.g., phase-shift keying or quadrature amplitude modulation) to data for transmission and provides modulated data to transmit baseband circuit 232, which in an embodiment includes a digital-to-analog converter and analog programmable gain filters. Transmit baseband circuit 232 provides the baseband (or intermediate frequency (IF)) signal to frequency mixer 234, which performs frequency translation or shifting of the baseband signal using a reference or local oscillator (LO) signal provided by local oscillator 236. In at least one operational mode of transmitter 104, frequency mixer 234 translates the baseband signal centered at DC to a 2.4 GHz frequency band. Pre-driver 238 amplifies the signal generated by frequency mixer 234 to a level sufficient for power amplifier 240. Power amplifier 240 further amplifies the signal to provide a higher power signal sufficient to drive passive network 242 and antenna 202. Passive network 242 provides impedance matching, filtering, and electrostatic discharge protection.

Figure 3:
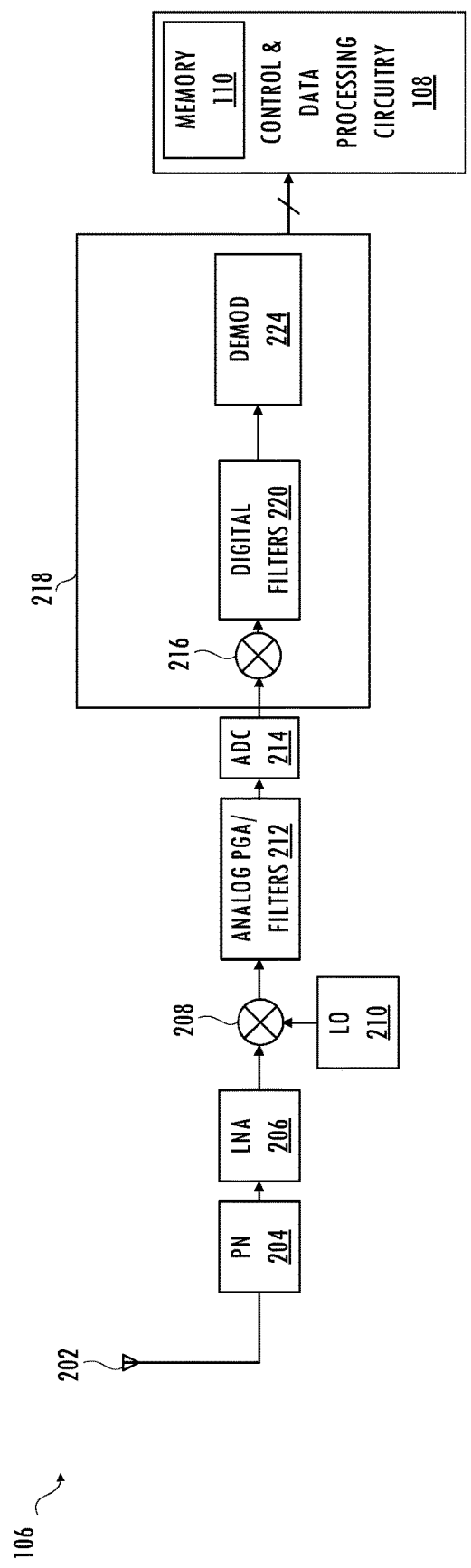
FIG. 3 illustrates a functional block diagram of the exemplary wireless communications receiver of FIG. 1.

FIG. 3 illustrates an exemplary embodiment of receiver 106 that may be included in a radio of the wireless communications devices described above. Antenna 202 provides a radio frequency (RF) signal to passive network 204, which provides impedance matching, filtering, and electrostatic discharge protection. Passive network 204 is coupled to low-noise amplifier 206, which amplifies the RF signal without substantial degradation to the signal-to-noise ratio and provides the amplified RF signal to frequency mixer 208. Frequency mixer 208 performs frequency translation or shifting of the RF signal using a reference or local oscillator signal provided by local oscillator 210. For example, in at least one operational mode of receiver 106, frequency mixer 208 translates the RF signal from a 2.4 GHz frequency band to baseband frequencies centered at DC (i.e., zero-intermediate frequency (ZIF) in a ZIF mode of operation). In another operational mode, receiver 106 is configured as a low-intermediate frequency (LIF) receiver (i.e., in a LIF mode of operation) and frequency mixer 208 translates the RF signal to a low-intermediate frequency (e.g., 100-200 kHz) to reduce or eliminate DC offset and 1/f noise problems of ZIF receivers.

Frequency mixer 208 provides the translated output signal as a set of two signals, an in-phase (I) signal and a quadrature (Q) signal. The I and Q signals are analog time-domain signals. In at least one embodiment of receiver 106, the analog programmable gain amplifier and filters 212 provide amplified and filtered versions of the I and Q signals to analog-to-digital converter (ADC) 214, which converts those versions of the I and Q signals to digital I and Q signals (i.e., I and Q samples). Exemplary embodiments of ADC 214 use a variety of signal conversion techniques (e.g., delta-sigma (i.e., sigma-delta) analog-to-digital conversion). ADC 214 provides the digital I and Q signals to signal processing circuitry 218. In general, signal processing circuitry 218 performs digital signal processing (e.g., frequency translation (e.g., using digital mixer 216), filtering (e.g., using digital filters 220), demodulation, or signal correction) of the digital I and Q signals. In at least one embodiment, signal processing circuitry 218 includes demodulator 224, which recovers or extracts information from digital I and Q signals (e.g., data signals, that were modulated using phase-shift keying or quadrature amplitude modulation by modulator 228 of transmitter 104 of FIG. 2 and provided to antenna 202 as RF signals).

Referring back to FIG. 3, control & data processing circuitry 108 may perform a variety of functions (e.g., logic, arithmetic, etc.). For example, control & data processing circuitry 108 may use the demodulated data in a program, routine, or algorithm (whether in software, firmware, hardware, or a combination thereof) to perform desired control or data processing tasks. In at least one embodiment, control & data processing circuitry 108, which includes memory 110, controls other circuitry, sub-system, or systems (not shown). In an embodiment, control & data processing circuitry 108 implements a data link layer that includes a state machine, defines state transitions, defines packet formats, performs scheduling, performs radio control, and provides link-layer decryption consistent with at least one wireless communications protocol. Transmitter 104 of FIG. 2 and receiver 106 of FIG. 3 are illustrative only and may vary with the communications protocol implemented by wireless communications system 100 of FIG. 1.

Figure 4:
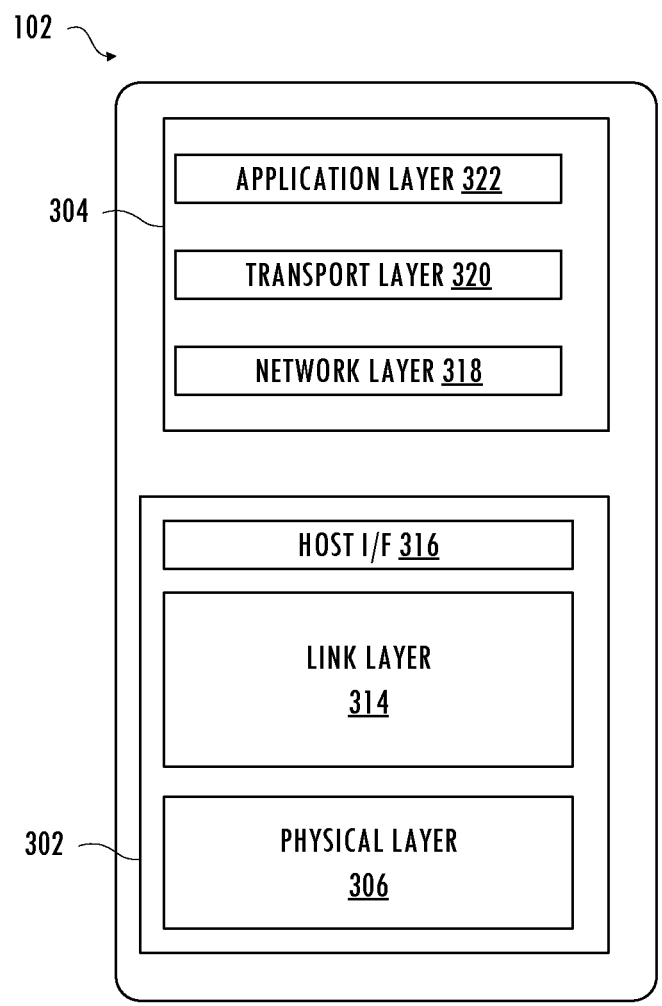
FIG. 4 illustrates a functional block diagram of a protocol stack executing on the exemplary wireless communications device of FIG. 1.

Referring to FIGS. 1 and 4, in an embodiment, wireless communications device 102 includes separate integrated circuits for implementing functions of control & data processing circuitry 108, e.g., controller 302 and host 304. In some embodiments, wireless communications device 102 incorporates functionality of controller 302 and host 304 in a single integrated circuit device. Controller 302 and host 304 execute instructions to implement portions of a wireless communications network protocol stack. For example, controller 302 implements physical layer 306, which includes software that interacts with the RF transceiver (e.g., including the transmitter and receiver described above). Link layer 314 interfaces directly to physical layer 306 to handle transmission and reception of associated signals. In at least one embodiment, link layer 314 of controller 302 communicates with host 304 via host interface 316. Host 304 implements upper layers of the communications protocol stack (e.g., network layer 318, transport layer 320, and application layer 322). In other embodiments, the layers of the software protocol stack have different distributions between controller 302 and host 304 or are completely implemented using controller 302.

Figure 5:
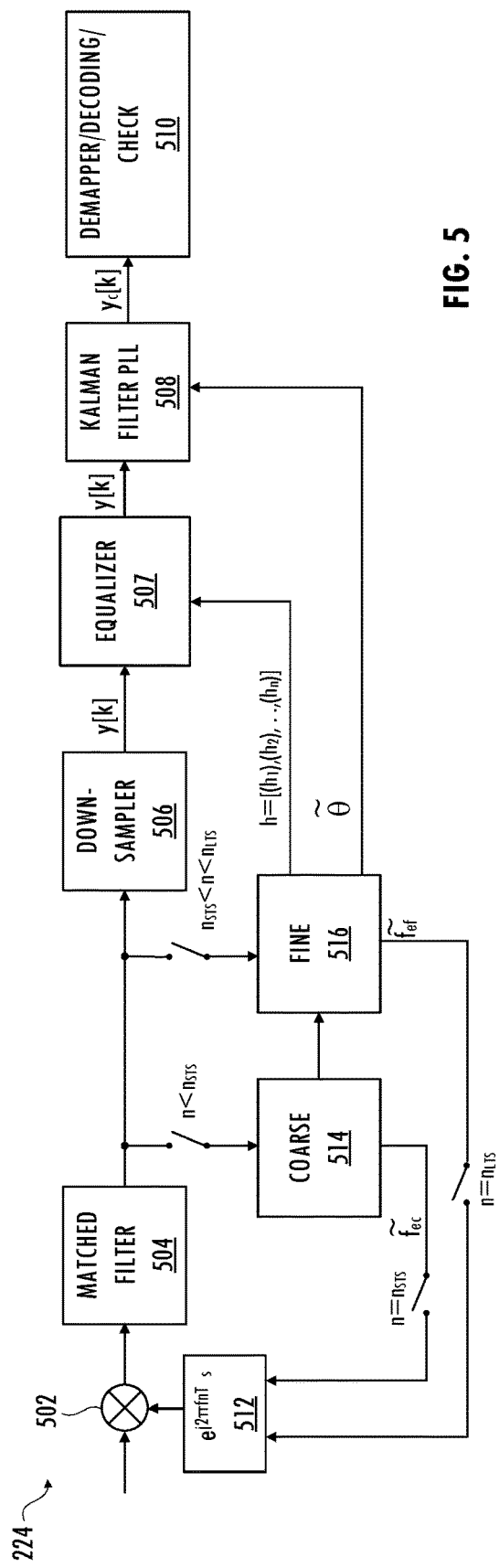
FIG. 5 illustrates a functional block diagram of a demodulator including a Kalman filter based phase-locked loop for phase-shift keying or quadrature amplitude modulated signals consistent with at least one embodiment of the invention.

Referring to FIGS. 3 and 5, in at least one embodiment, demodulator 224 receives a digital intermediate frequency signal and digital mixer 502 frequency shifts the signal to baseband (e.g., ZIF) using a reference signal. Under ideal conditions, the baseband signal provided by mixer 502 is perfectly centered around DC. However, mismatch between the remote oscillator of the transmitting wireless communications device and the local oscillator of the receiving wireless communications device causes a frequency or phase offset in the baseband signal. Matched filter 504 increases the signal-to-noise ratio of the received signal but introduces a delay. During a first phase of receiver processing (e.g., during a short training sequence of a preamble sequence, i.e., $n < n_{STS}$), coarse timing detection and frequency estimation 514 generates a coarse frequency correction $\widetilde{f_{ec}}$ to reduce the frequency offset. During a second phase of receiver processing (e.g., during a long training sequence of preamble sequence, i.e., $n_{STS} < n \le n_{LTS}$), fine timing detection and frequency and phase estimation 516 generates fine frequency error correction $\widetilde{f_{ef}}$ and initial phase estimate $\hat{\theta}$ to further reduce the frequency or phase offset. The fine timing detection and frequency and phase estimation 516 also generates and supplies a channel estimate (h) to equalizer 507, which in an embodiment includes a linear minimum mean squared error (LMMSE) equalizer.

In an embodiment of demodulator 224, mixer 502 digitally mixes the received signal with a reference signal (e.g., a tone having a programmable frequency) generated by signal generator 512. Prior to detecting the short training sequence (i.e., $n < n_{STS}$), signal generator 512 is programmed to generate an intermediate frequency tone having frequency $f_{if}$, which is used to down convert the received signal to baseband or DC using mixer 502. After detecting the short training sequence, but before detecting the long training sequence (i.e., $n_{STS} < n \le n_{LTS}$), signal generator 512 is programmed to a coarsely corrected value having frequency $f_{if} + \widetilde{f_{ec}}$ to further down-convert the received signal and compensate for frequency offset. After detecting the long training sequence (i.e., $n > n_{LTS}$), signal generator 512 is programmed to a finely corrected value having frequency $f_{if} +$ $\widetilde{f_{ec}} + \widetilde{f_{ef}}$. Signal generator 512 adjusts the reference signal by initial phase estimate $\tilde{\theta}$, coarse frequency correction $\widetilde{f_{ec}}$, or fine frequency correction $\widetilde{f_{ef}}$, and thus, mixer 502 applies error correction to the received signal. Downsampler 506 generates received signal y[k], which is a version of the received signal that is downsampled from a sample space to a symbol space, and supplies received signal y[k] to the equalizer 507. Kalman filter based phase-locked loop 508, described in detail below, applies initial phase estimate $\tilde{\theta}$ to the received signal and corrects any residual phase error in corrected received signal y$_c$[k], which is a phase-corrected version of received signal y[k]. Demapper/decoding/check circuit 510 recovers transmitted data from corrected received signal y$_c$[k] using demapping, decoding, and error correction techniques.

Figure 6A:
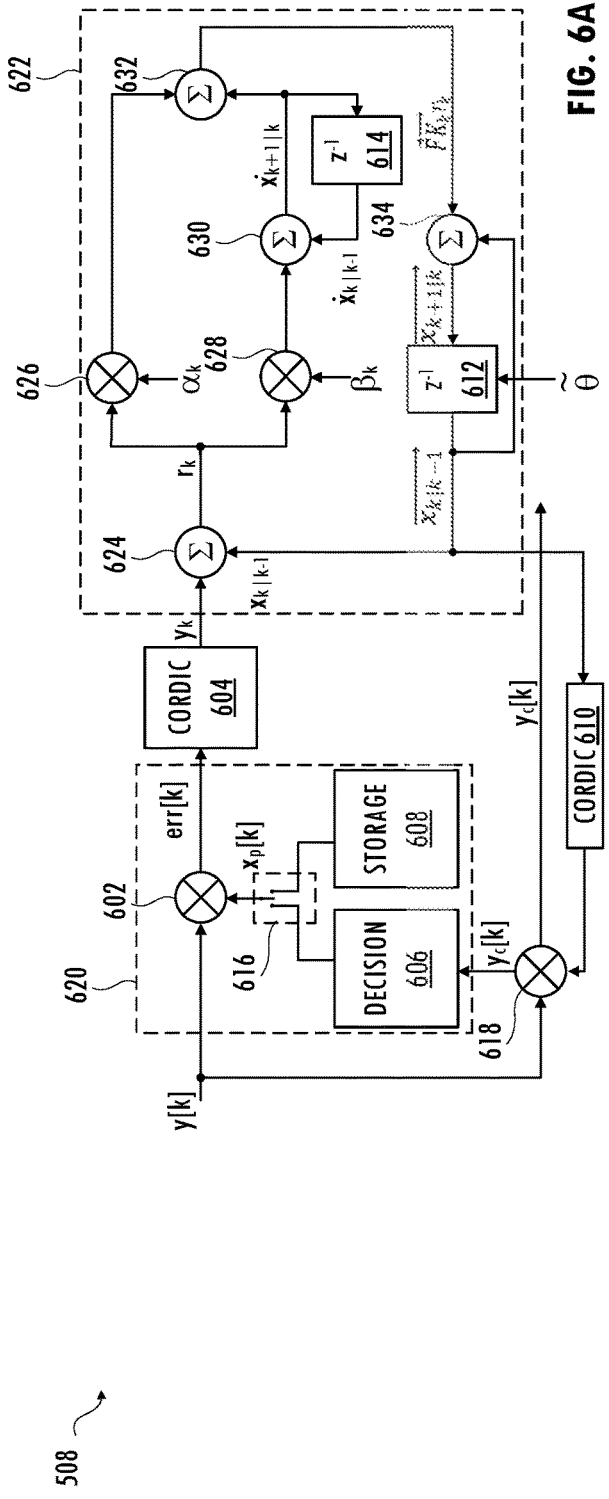
FIGS. 6A and 6B illustrate functional block diagrams of a Kalman filter based phase-locked loop for receiving phase-shift keying or quadrature amplitude modulated signals using a slice-based phase detector consistent with embodiments of the invention.

Referring to FIG. 6A, in at least one embodiment, Kalman filter based phase-locked loop 508 includes phase detector 620 and Kalman filter 622. In at least one embodiment, phase detector 620 multiplies received signal y[k] by a complex conjugate of a reference signal, i.e., an expected received signal, to extract frequency offset and generate error signal err[k]. In at least one embodiment, phase detector 620 includes switch 616, which selectively provides a predetermined signal, e.g., a signal based on the Access Address field of a BLE packet, as expected signal x$_p$[k] to multiplier 602 according to sample index k. For example, if k≤n$_{AAEND}$, then switch 616 provides a corresponding output of storage 608, e.g., samples of the predetermined Access Address (in Cartesian coordinates, i.e., real and imaginary values corresponding to the in-phase and quadrature values) as expected signal x$_p$[k]. If k>n$_{AAEND}$, then switch 616 provides the output of decision circuit 606 as expected signal x$_p$[k]. In general, all BLE packets include the Access Address to identify communications on a physical channel, and to exclude or ignore packets on different physical channels that are using the same physical interface channels in physical proximity. The Access Address determines whether the packet is directed to an advertising physical channel (and thus an advertising physical link) used for non-periodic advertising, to the periodic physical channel used for periodic advertising, or to a piconet physical channel (and thus an active physical link to a device). The BLE advertising physical channel used for non-periodic advertising uses a fixed Access Address. The BLE periodic physical channel used for periodic advertising and BLE piconet physical channels use a randomly generated 32-bit value as their Access Address.

In at least one embodiment, decision circuit 606 generates expected signal x$_p$[k], which is used as a reference signal, by comparing a corrected version of the received signal to predetermined modulated values and provides the nearest predetermined modulated value (in Cartesian coordinates, i.e., real and imaginary values corresponding to the in-phase and quadrature values) as expected signal x$_p$[k]. In general, decision circuit 606 performs a slicing operation that maps the corrected version of the received signal, which includes noise, to the closest noise-free constellation point of the applicable modulation scheme (e.g., the constellation point of the of the applicable modulation scheme having the minimum Euclidian distance to the corrected received signal y$_c$[k]).

In at least one embodiment, CORDIC 604 converts error signal err[k] from Cartesian coordinates to polar coordinates using a COordinate Rotation DIgital Computer (CORDIC), which may be dedicated to a phase measurement implementation or shared with other operations of the receiver. In general, a CORDIC implements known techniques to perform calculations, including trigonometric functions (e.g., an arctangent function) and complex multiplies, without using a multiplier. The only operations the CORDIC uses are addition, subtraction, bit-shift, and table-lookup operations to implement the arctangent function. In other embodiments, a digital signal processor executing firmware or an arctangent circuit is used to convert error signal err[k] from Cartesian coordinates to polar coordinates.

CORDIC 604 provides phase y$_k$, as the input to Kalman filter 622. Kalman filter 622 determines residual phase error signal r$_k$ by computing the difference between phase y$_k$ and predicted instantaneous phase x$_{k|k-1}$. Phase difference circuit 624 provides residual phase error signal r$_k$ to a proportional integral time-invariant controller including a proportional path (represented by gain circuit 626) and an integral path (represented by gain circuit 628, accumulator 630, and register 614). Summing circuit 632 combines the outputs of the proportional path and the integral path and provides a predicted frequency signal to an integrator represented by accumulator 634 and register 612. The integrator provides the predicted instantaneous phase signal, $\vec{x}_{(k|k-1)}$, to phase difference circuit 624 and to CORDIC 610, which converts the predicted instantaneous phase signal from polar coordinates to Cartesian coordinates for use as an error correction signal to be combined with received signal y[k] by correction circuit 618 to generate corrected received signal y$_c$[k].

In an embodiment, Kalman filter based phase-locked loop 508 can be modeled by defining a state $$\vec{x}_k = \begin{bmatrix} x_k \\ \dot{x}_k \end{bmatrix},$$

where x$_k$ is instantaneous phase and $\dot{x}_k$ is frequency. The state transition model is $$\vec{x_{k+1}} = \vec{F}\vec{x_k} + \vec{W_k} = \begin{bmatrix} 1 & 1 \\ 0 & 1 \end{bmatrix}\begin{bmatrix} x_k \\ \dot{x}_k \end{bmatrix} + \begin{bmatrix} w_k \\ \dot{w}_k \end{bmatrix}.$$

The observation model is $$y_k = \vec{H}\vec{x_k} + v_k = [1\ 0]\begin{bmatrix} x_k \\ \dot{x}_k \end{bmatrix} + v_k = x_k + v_k.$$

The prediction model is $$\vec{x_{(k|k-1)}} = \begin{bmatrix} x_{(k|k-1)} \\ \dot{x}_{(k|k-1)} \end{bmatrix};$$

$$\vec{x_{(k+1|k)}} = \vec{F}\vec{x_{(k|k-1)}} + \vec{F}\vec{K_k}r_k,$$

where $\vec{F}$ is the state transition matrix, $\vec{H}$ is the observation matrix, v$_k$ is the phase variance, $\vec{K_k}$ is the loop gain vector $$\begin{bmatrix} \alpha_k \\ \beta_k \end{bmatrix},$$

$r_k$ is the error that drives or controls the prediction, and $r_k = y_k + \vec{H}\vec{X}_{(k|k-1)}$. Register 612 is initialized with initial phase estimate $\hat{\theta}$, which is provided by fine timing detection and frequency and phase estimation 516.

Figure 10:
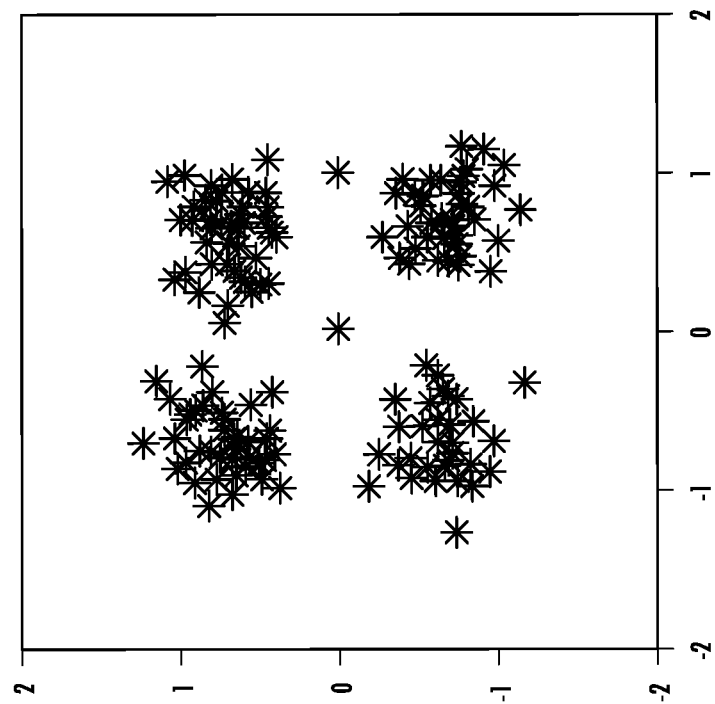
FIG. 10 illustrates a quadrature amplitude modulated constellation of data in the received signal after filtering by a Kalman filter based phase-locked loop consistent with at least one embodiment of the invention.

For an exemplary received signal $y[k]=e^{j(\theta_m + 2\pi f_{OS} k + \theta_u)}$, where $\theta_m$ is the modulated phase for phase-shift keying, $f_{OS}$ is the frequency offset between the remote oscillator of the transmitter and the local oscillator of the receiver, and $\theta_u$ is a random phase offset, the following table illustrates exemplary values in FIG. 6A, where the first two symbols (k=1 and k=2) correspond to predetermined Access Address values and the following three symbols (k=3, 4, 5) correspond to data symbols.

and 6B. FIG. 10 illustrates an example of corrected received samples $y_c[k]$ output by Kalman filter based phase-locked loop 508 of FIGS. 5, 6A, and 6B where Kalman filter based phase-locked loop 508 reduces or eliminates rotation of the constellation caused by frequency and phase offset in the received signal. Thus, Kalman filter based phase-locked loop 508, which is a phase-locked loop having variable gain consistent with Kalman filter theory and has faster convergence than a conventional phase-locked loop with fixed gain, improves performance of a receiver in a wireless communications system (e.g., improves signal-to-noise ratio of the received signal and thus facilitates communications at increased information rates) in applications having data transmitted in bursts or packets, e.g., BLE.

| y[k] | $x_p[n]$ | err[n] | $y_k$ | $x_{k|k-1}$ | $y_c[k]$ |
|---|---|---|---|---|---|
| $e^{j\frac{\pi}{4}+2\pi 10^3(1)+\frac{\pi}{5}}$ | $e^{j\frac{\pi}{4}}$ | $e^{j(2\pi 10^3(1)+\frac{\pi}{5})}$ | $2\pi 10^3(1)+\frac{\pi}{5}$ | $2\pi 10^3(1)+\frac{\pi}{5}+\frac{\pi}{100}$ | NA (AA) |
| $e^{j\frac{3\pi}{4}+2\pi 10^3(2)+\frac{\pi}{5}}$ | $e^{j\frac{3\pi}{4}}$ | $e^{j(2\pi 10^3(2)+\frac{\pi}{5})}$ | $2\pi 10^3(2)+\frac{\pi}{5}$ | $2\pi 10^3(2)+\frac{\pi}{5}+\frac{\pi}{100}-\frac{\pi}{150}$ | NA (AA) |
| $e^{-j\frac{\pi}{4}+2\pi 10^3(3)+\frac{\pi}{5}}$ | $e^{-j\frac{\pi}{4}}$ | $e^{j(2\pi 10^3(3)+\frac{\pi}{5})}$ | $2\pi 10^3(3)+\frac{\pi}{5}$ | $2\pi 10^3(3)+\frac{\pi}{5}-\frac{\pi}{150}$ | $e^{-j\frac{\pi}{4}-\frac{\pi}{150}}$ |
| $e^{-j\frac{\pi}{4}+2\pi 10^3(4)+\frac{\pi}{5}}$ | $e^{-j\frac{\pi}{4}}$ | $e^{j(2\pi 10^3(4)+\frac{\pi}{5})}$ | $2\pi 10^3(4)+\frac{\pi}{5}$ | $2\pi 10^3(4)+\frac{\pi}{5}-\frac{\pi}{120}$ | $e^{-j\frac{\pi}{4}-\frac{\pi}{120}}$ |
| $e^{-j3\frac{\pi}{4}+2\pi 10^3(5)+\frac{\pi}{5}}$ | $e^{-j\frac{3\pi}{4}}$ | $e^{j(2\pi 10^3(5)+\frac{\pi}{5})}$ | $2\pi 10^3(5)+\frac{\pi}{5}$ | $2\pi 10^3(5)+\frac{\pi}{5}-\frac{\pi}{90}$ | $e^{-j\frac{3\pi}{4}-\frac{\pi}{90}}$ |

Figure 6B:
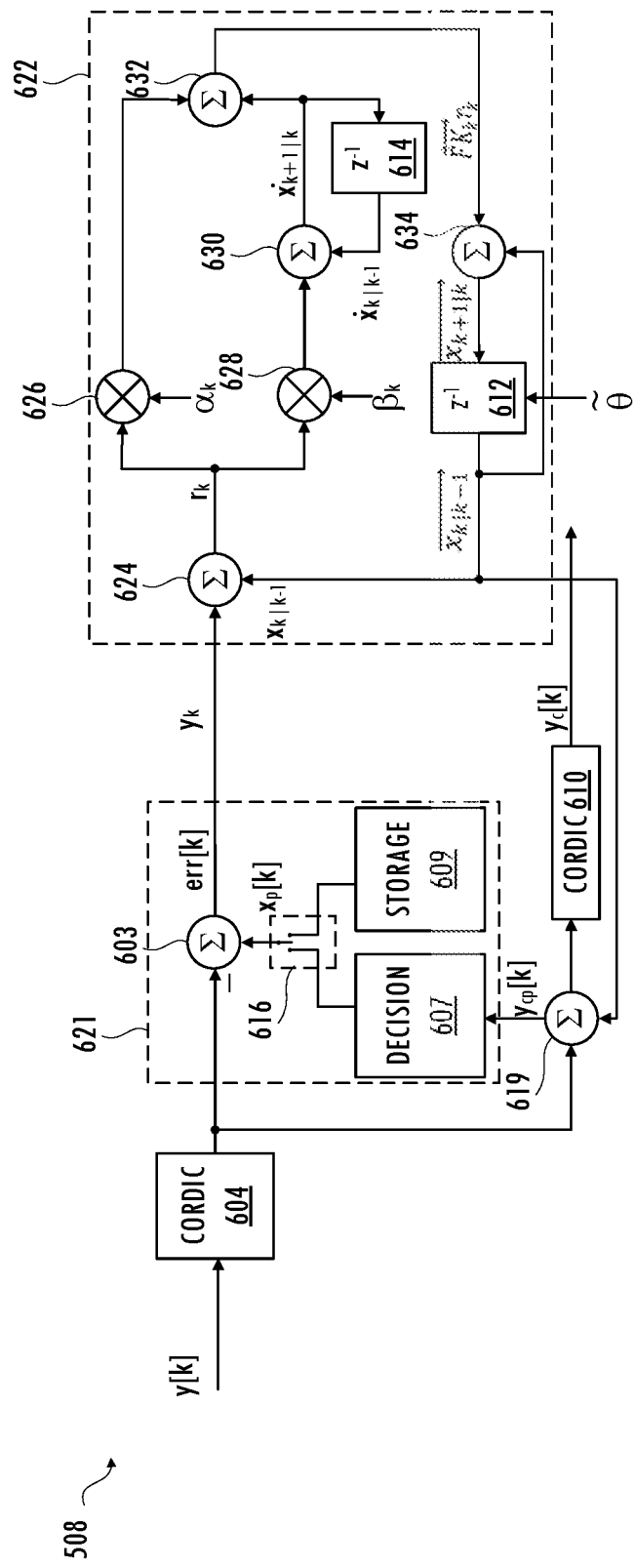

Referring to FIG. 6B, in other embodiments of Kalman filter based phase-locked loop 508, the conversions between Cartesian coordinates and polar coordinates are performed outside of the loop, thereby decreasing computational complexity of Kalman filter based phase-locked loop 508. Decision circuit 607 and storage 609 provide outputs (e.g., a binary quantization of a demodulated signal and predetermined Access Address symbols, respectively) in polar coordinates. CORDIC 604 and CORDIC 610 perform the conversions between Cartesian coordinates and polar coordinates outside of the loop and phase detector 621 uses adder 603 to generate error signal err[k] based on the reference signal provided by decision circuit 607 or storage circuit 609 and the loop performs addition using adder 619 to determine the phase error and perform correction, respectively, instead of performing complex multiplications, as required by the embodiment of FIG. 6A. Referring to FIG. 6B, CORDIC 604 converts received signal y[k] from Cartesian coordinates to polar coordinates and CORDIC 610 converts the corrected signal from polar coordinates to Cartesian coordinates to generate corrected received signal $y_c[k]$.

Figure 7:
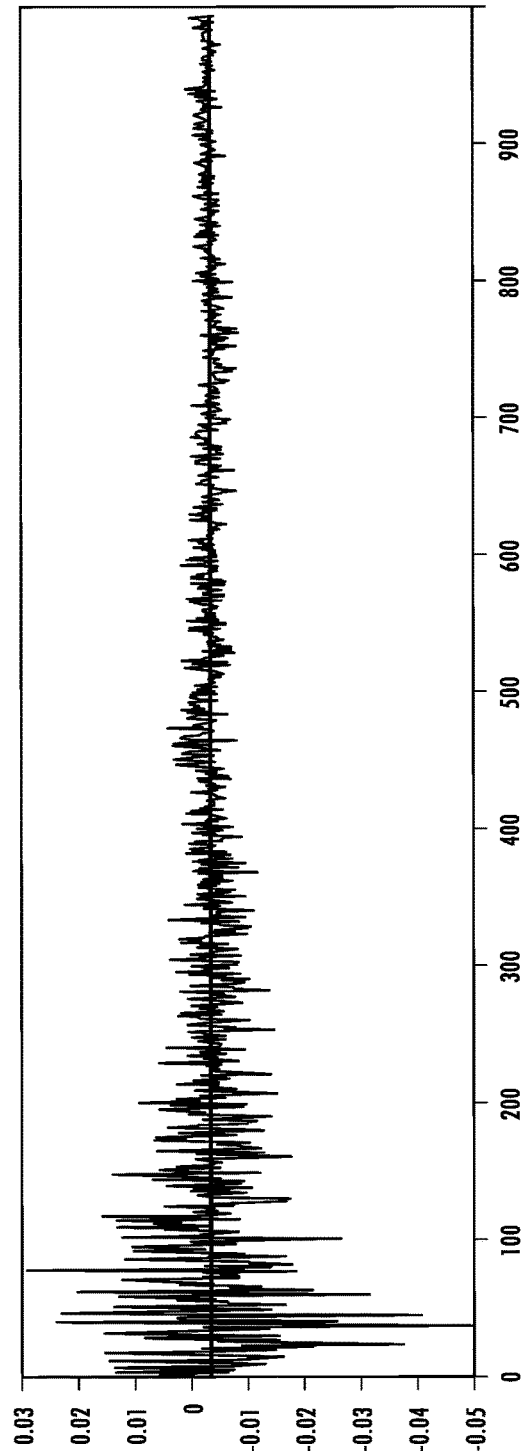
FIG. 7 illustrates a waveform of predicted frequency as a function of sample index at the output of the proportional integral controller of FIGS. 6A and 6B consistent with at least one embodiment of the invention.
Figure 8:
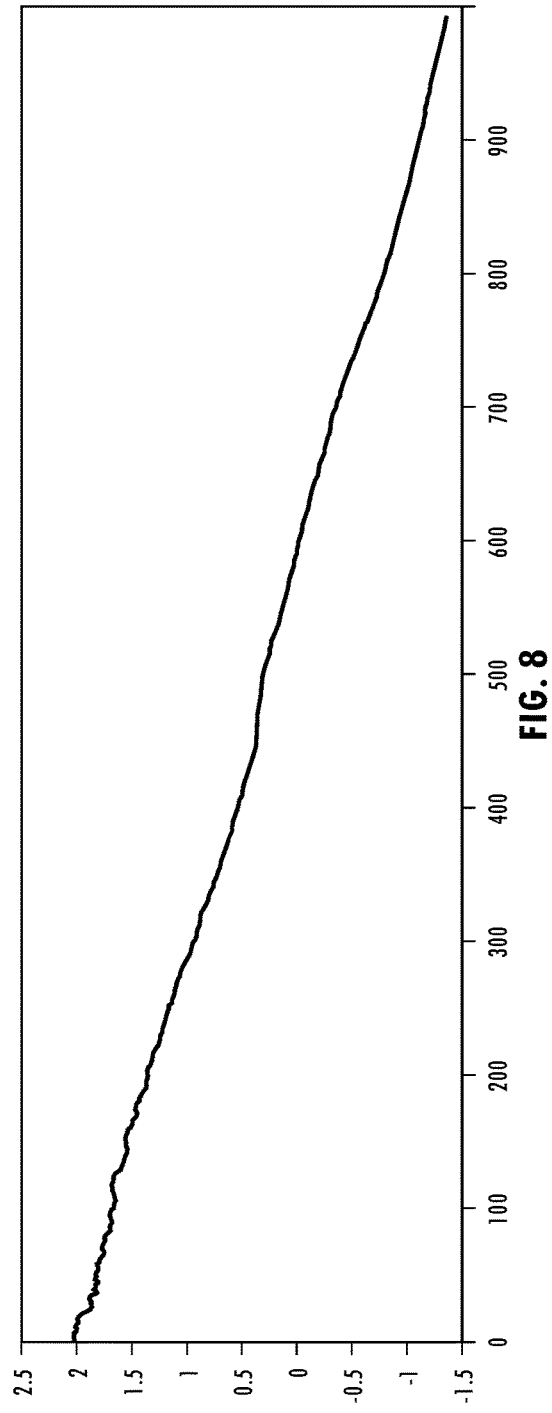
FIG. 8 illustrates a waveform of predicted instantaneous phase as a function of sample index of FIGS. 6A and 6B consistent with at least one embodiment of the invention.
Figure 9:
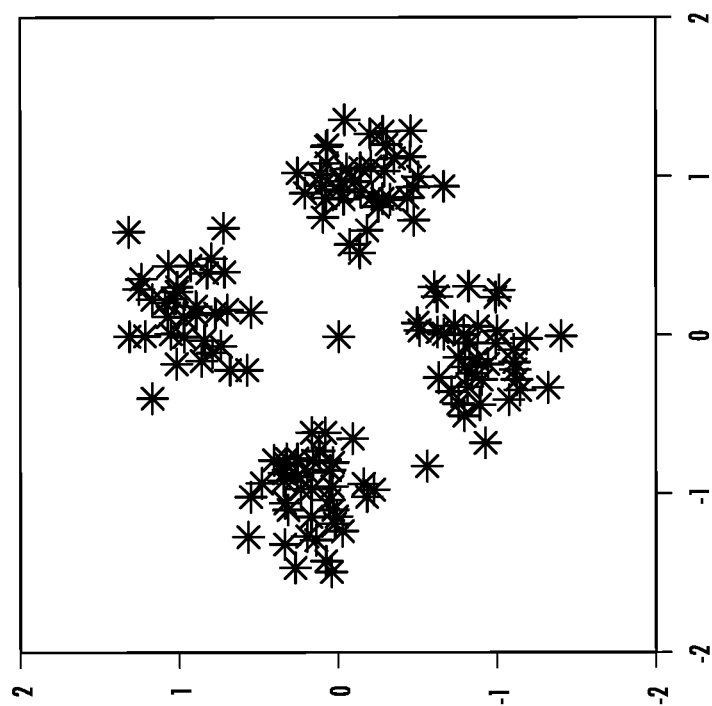
FIG. 9 illustrates a quadrature amplitude modulated constellation of data in a received signal before filtering by a Kalman filter based phase-locked loop consistent with at least one embodiment of the invention.

FIG. 7 illustrates an example of the predicted frequency signal at the output of summing circuit 632 of FIGS. 6A and 6B, where Kalman filter based phase-locked loop 508 maintains the predicted frequency of the residual signal at a negligible value after training of Kalman filter based phase-locked loop 508 to converge the predicted frequency of the residual signal to a negligible value as sample time increases. FIG. 8 illustrates an example of the predicted instantaneous phase signal $x_{k|k-1}$ at the output of the integrator represented by accumulator 634 and register 612 of FIGS. 6A and 6B where the predicted instantaneous phase signal has linear behavior as a function of sample time. FIG. 9 illustrates an example of received signal y[k] prior to Kalman filter based phase-locked loop 508 of FIGS. 5, 6A, In other embodiments of a Kalman filter based phase-locked loop, performance is further improved by using a re-encoding-based decision circuit that can provide an improved reference signal in the tracking mode of operation instead of decision circuit 606. In at least one embodiment, a transmitter of the wireless communications system encodes data using a convolutional error-correcting code and a corresponding receiver of the wireless communications system uses soft-decision decoding techniques to recover the data. In an embodiment, transmitter 104 of FIG. 2 encodes data for transmission using a conventional forward error correction encoder implementing a non-systematic, non-recursive rate 1/2 code with constraint length K=4. In an exemplary embodiment, the initial state of the convolutional forward error correcting encoder is set to all zeros. Generator polynomials of the convolutional forward error correcting encoder are:

$$G_0(x) = 1 + x + x_2 + x_3; \text{ and}$$

$$G_1(x) = 1 + x_2 + x_3.$$

The bit produced by generator polynomial $G_0$ ($a_0$) is transmitted before transmitting the bit produced by generator polynomial $G_1$ ($a_1$). An input sequence of three consecutive zeros always brings the convolutional forward error correcting encoder back to its original state. This sequence is known as the termination sequence. A pattern mapper maps P bits output from the convolutional forward error correcting encoder into a symbol, where the value of P depends on the coding scheme in use. However, other encoding and mapping schemes may be used. Accordingly, receiver 106 of FIG. 3 includes a soft-decision decoder in demodulator 224 and uses reliability information for estimating transmitted symbols based on the received radio frequency signal.

Figure 11:
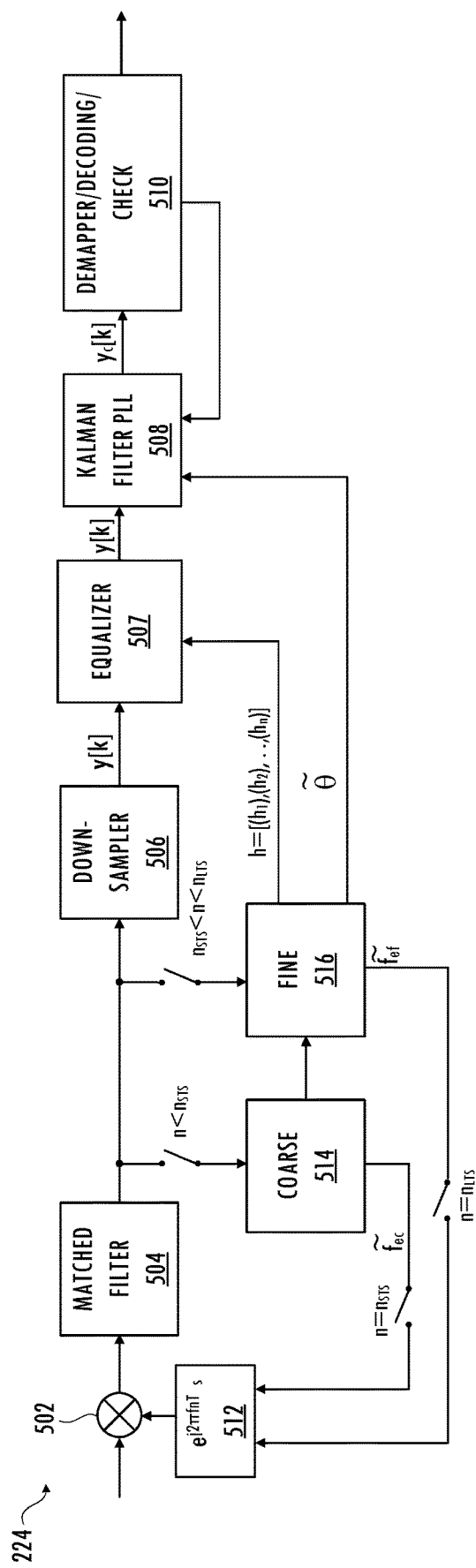
FIG. 11 illustrates a functional block diagram of a demodulator including a Kalman filter based phase-locked loop for phase-shift keying or quadrature amplitude modulated signals using a Kalman filter based phase-locked loop with a re-encoding-based phase detector consistent with at least one embodiment of the invention.
Figure 12:
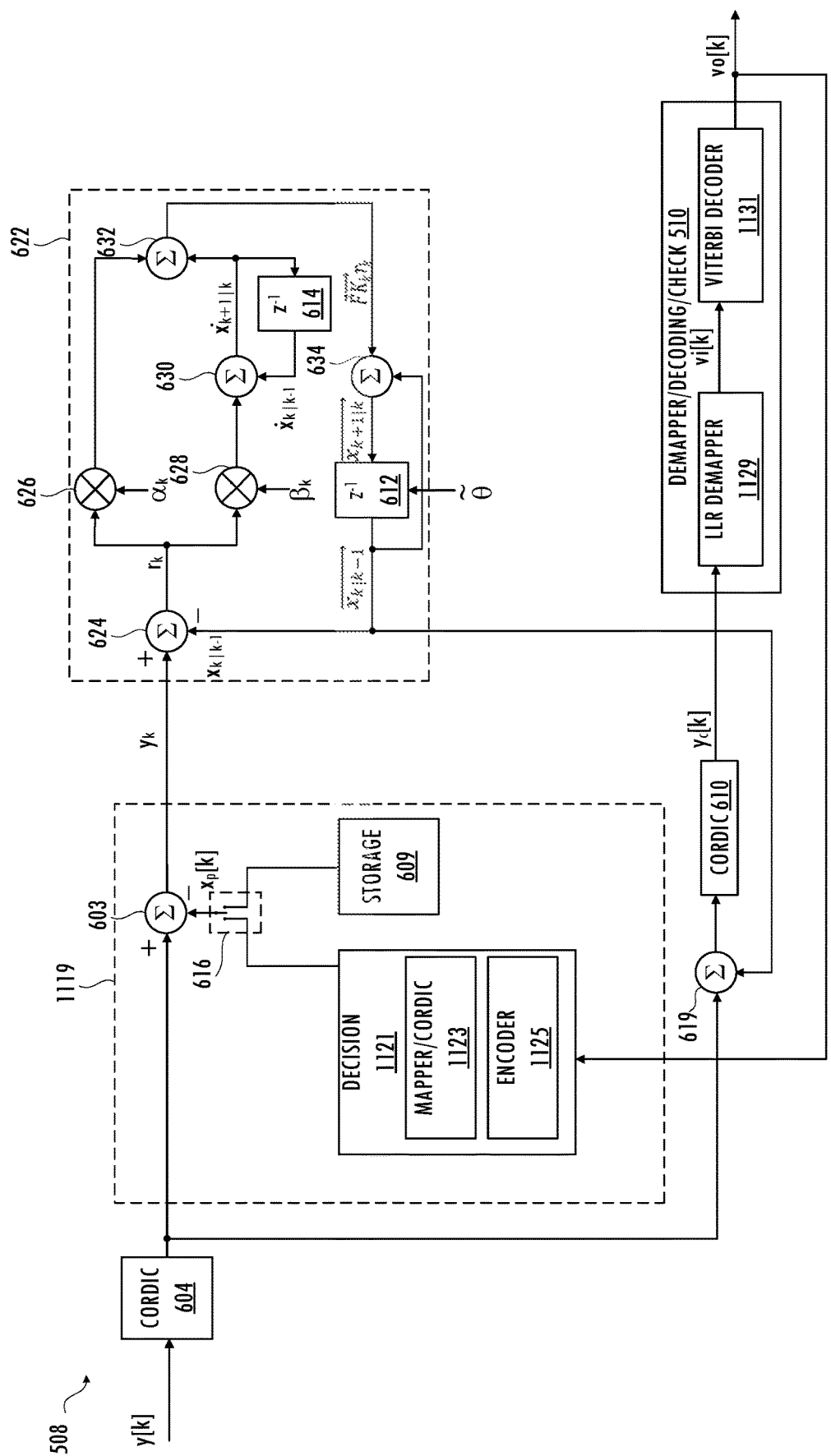
FIG. 12 illustrates a functional block diagram of a Kalman filter based phase-locked loop with a re-encoding-based phase detector consistent with at least one embodiment of the invention.
Figure 13A:
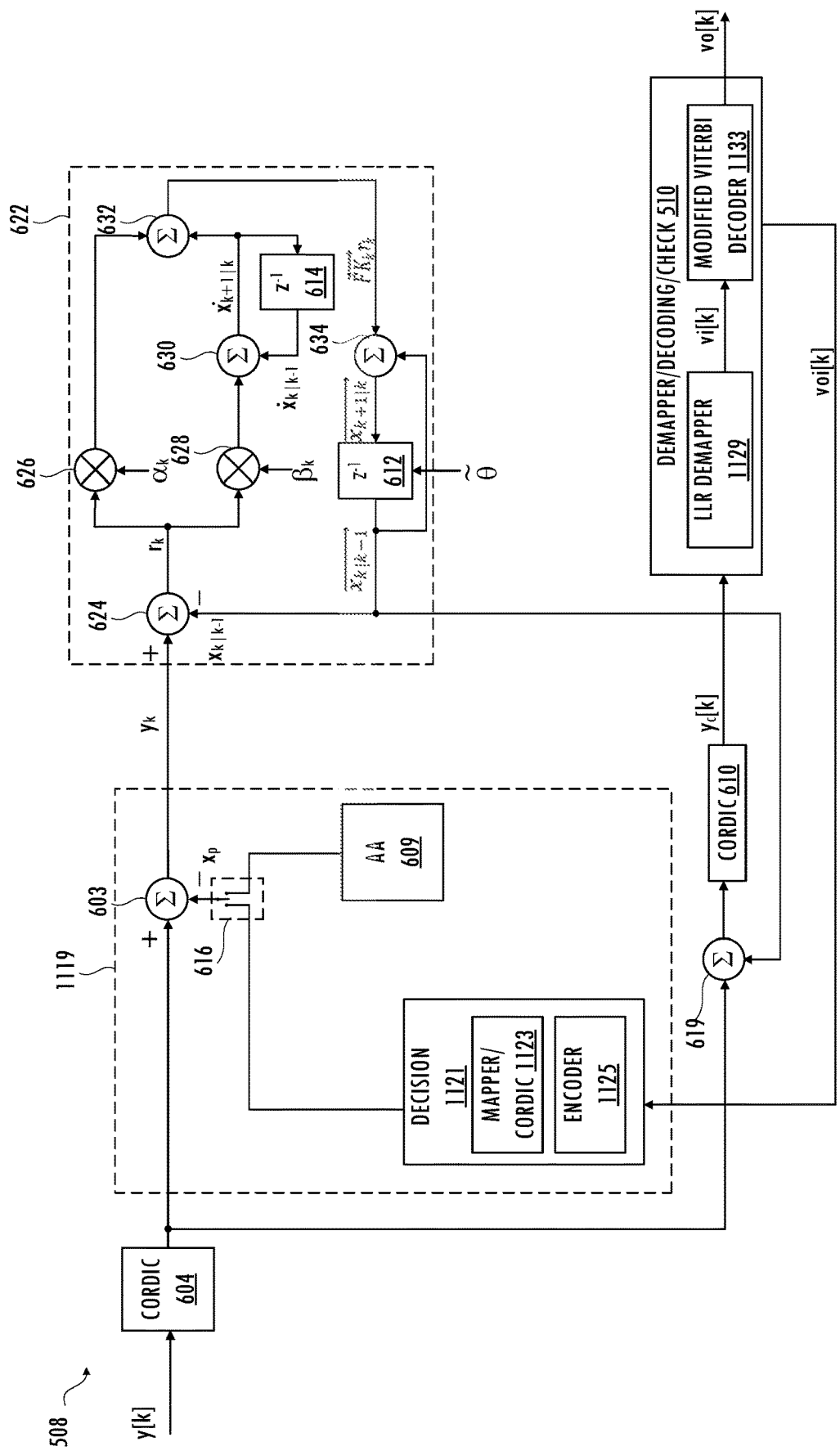
FIGS. 13A and 13B illustrate a functional block diagram of a Kalman filter based phase-locked loop with a re-encoding-based phase detector coupled to a modified Viterbi decoder consistent with various embodiments of the invention
Figure 13B:
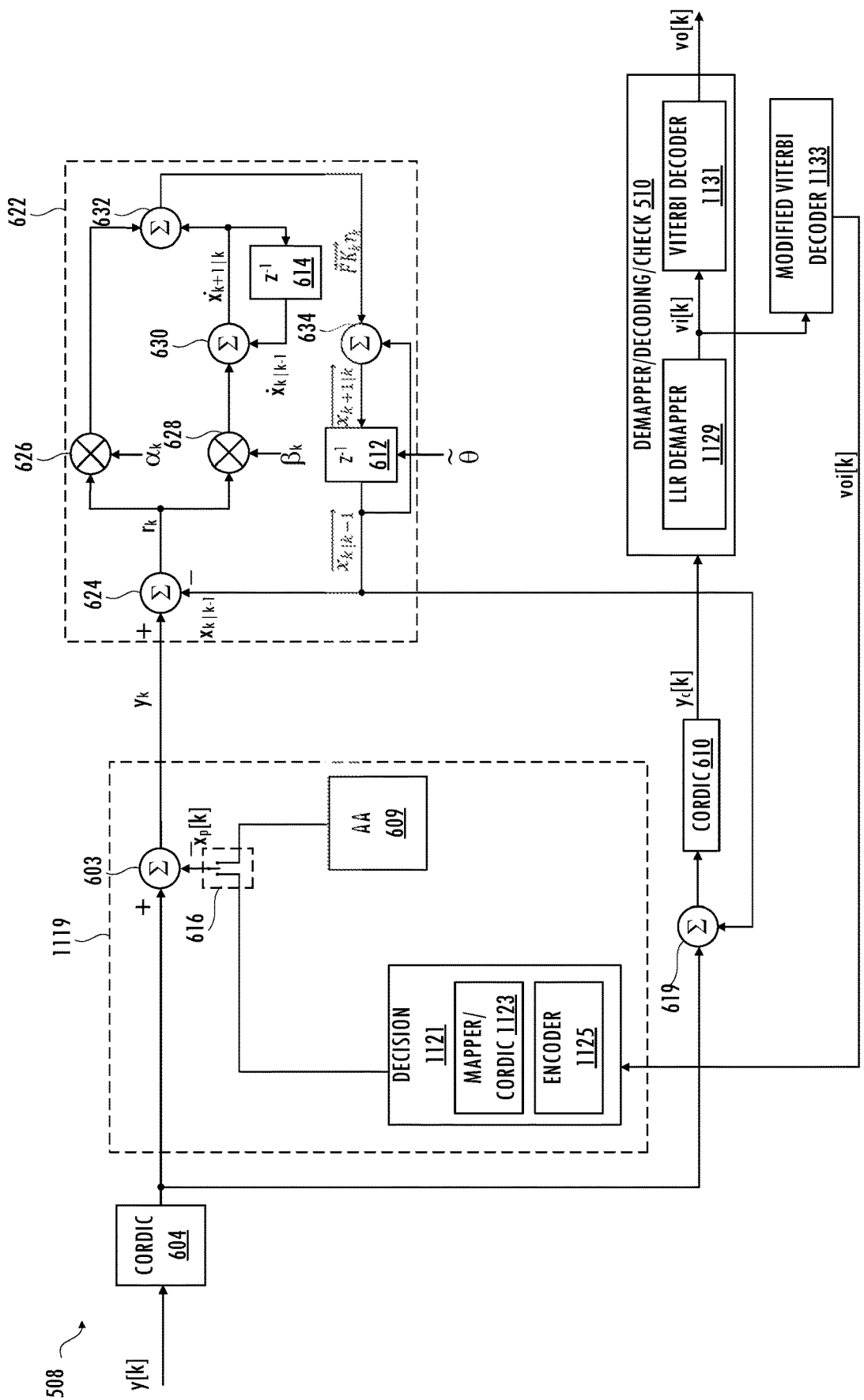

Referring to FIGS. 11 and 12, in an embodiment of demodulator 224, demapper/decoding/check circuit 510 includes log-likelihood ratio (LLR) soft-decision demapper and a conventional decoder that implements conventional maximum likelihood decoding and Viterbi decoding techniques. In an embodiment, demapper/decoding/check circuit 510 provides the demapped and decoded received symbols output by the Viterbi decoder to Kalman filter based phase-locked loop 508 for use in generating expected signal $x_p[k]$, which is used by the phase detector as a reference signal for generating phase $y_k$. In the tracking mode of operation, phase detector 1119 extracts the frequency offset using decision circuit 1121. In an embodiment, demapper/decoding/check circuit 510 includes log-likelihood ratio (LLR) soft-decision demapper 1129, which demaps constellation points of a phase-shift keying or quadrature amplitude modulated signal according to a conventional technique. For example, LLR soft-decision demapper 1129 generates soft decision outputs from corrected received signal $y_c[k]$. In an embodiment, each corrected received symbol $y_c[k]$ includes an in-phase and quadrature component and LLR soft-decision demapper 1129 generates a corresponding soft decision output (e.g., [d1, d2] for QPSK, [d1, d2, d3] for 8 BPSK, or [d1, d2, d3, d4] for 16 QAM, where d1, d2, d3, and d4 are real values indicating the both a hard decision and a reliability of the decision).

In an embodiment, demapper/decoding/check circuit 510 includes Viterbi decoder 1131, which implements a conventional Viterbi algorithm for decoding the soft-decision signal vi[k] where the bitstream has been encoded using a convolutional code or trellis code. Viterbi decoder 1131 uses branch metrics (e.g., log-likelihood measure of the probability of a corresponding state transition of a state diagram) and path metrics (e.g., sum of the branch metrics of the branches that a path traverses) to find the most likely received data symbols (e.g., by identifying a minimum distance path through a trellis diagram corresponding to conventional maximum likelihood decoding and Viterbi decoding techniques). Each path metric corresponds to a number of errors on a maximum-likelihood path to an associated state and each branch metric corresponds to a Hamming distance between received parity and expected parity or a reliability metric for each received symbol. Viterbi decoder 1131 provides Viterbi decoded signal vo[k] to decision circuit 1121. Encoder 1125 re-encodes Viterbi decoded signal vo[k] and mapper/CORDIC circuit 1123 maps the re-encoded signal to phase-shift keying or quadrature amplitude modulation symbols and converts those modulated symbols to polar coordinates to generate expected signal $x_p[k]$. In other embodiments of Kalman filter based phase-locked loop 508 where the CORDIC is within the loop (e.g., using a topology consistent with FIG. 6A), mapper/CORDIC circuit 1123 is configured to forgo the CORDIC operation that converts the modulated symbols to polar coordinates. Viterbi decoder 1131 introduces a substantial delay before providing a sample of Viterbi decoded signal vo[k] corresponding to a sample of received signal y[k].

The traceback length (TL) (i.e., traceback depth or traceback value) of the Viterbi decoder is related to the delay of the Viterbi decoder. In general, the traceback length of a Viterbi decoder is an integer indicating the number of trellis branches used to construct each traceback path. In an embodiment of a conventional Viterbi decoder, TL is an integer that is five times the constraint length of the error correcting code. An exemplary forward error correction code has constraint length K=4 and a typical traceback length of a corresponding Viterbi decoder is 20, although greater traceback lengths (e.g., 30 or 40) may be used. A conventional Viterbi decoder selects the path with the lowest cumulative path metric at time $t_i$. If two paths are equal, the Viterbi decoder selects a path arbitrarily. The conventional Viterbi decoder accumulates branch metrics from state to state to generate the path metrics and outputs symbols corresponding to a decision on the minimum path after the full traceback length TL. Accordingly, a symbol of Viterbi decoded signal vo[k] corresponding to a symbol of received signal y[k] is not available until at least TL symbol periods (e.g., 20 symbol periods) later. To accommodate that latency, the complexity of Kalman filter phase-locked loop 508 increases substantially to account for predicting TL symbols ahead. .

Referring to FIGS. 13A-13D, 14, and 15 a technique for simplifying a Kalman filter based phase-locked loop for use with a re-encoding-based phase detector includes using a modified Viterbi decoder that provides a preliminarily decoded symbol as an output based on at least one soft-decision signal vi[k] of a corrected received signal that is corrected based on the error between a reference signal and a baseband version of a received radio frequency signal. The preliminarily decoded signal voi[k] is further based on a decision for the minimum path metric for a preliminary set of decoder states (i.e., a set of decoder states corresponding to less than a full traceback length TL). The path metrics have a preliminary traceback length (PTL), where PTL is an integer, and 0≤PTL<TL. An embodiment of a modified Viterbi decoder accumulates branch metrics from state to state over the traceback length TL to generate path metrics but unlike a conventional Viterbi decoder, the modified Viterbi decoder outputs preliminarily decoded signal voi[k] corresponding to a decision for a minimum path in the same symbol time as received signal y[k]. For example, if PTL=0, then the modified Viterbi decoder outputs a decision on a minimum path in the same symbol time as a corresponding symbol of the received signal y[k]. If PTL=1, then the modified Viterbi decoder outputs symbols corresponding to a decision on a minimum path after a latency of one symbol time from a corresponding symbol of the received signal y[k].

Pseudocode for an embodiment of Viterbi decoder 1131 and pseudocode for an embodiment of modified Viterbi decoder 1133 are illustrated in FIGS. 13C and 13D, respectively. Viterbi decoder 1131 and modified Viterbi decoder 1133 each receive soft-decision signal vi[k] as inputs. For each time index k, vi[k] corresponds to $vi_{k,n}$, which includes N soft bits per decode bit, which are indexed by n (e.g., N=2 and n∈[1,2] for decoding a 1/2 rate convolutional code). Viterbi decoder 1131 and modified Viterbi decoder 1133 each output decoded bits as Viterbi decoded signal vo[k]. However, modified Viterbi decoder 1133 also outputs preliminarily decoded signal voi[k], which is re-encoded by decision circuit 1121. In exemplary embodiments, parameters used by Viterbi decoder 1131 and modified Viterbi decoder 1133 each include states $s_k$ having different likelihoods, where a total number of states of the decoder is S, where $s_0 \le s_k \le s_{S-1}$, and each state has two branches in trellis diagram corresponding to conventional maximum likelihood decoding and Viterbi decoding techniques. For decoding an exemplary convolutional code with a constraint length of 3, $S=2^{3-1}=4$. Viterbi decoder 1131 and modified Viterbi decoder 1133 each use parameter $x_{k,n}^m$, which corresponds to expected soft bits at the $n^{th}$ position for branch m of the trellis diagram. Additional parameters include $s_{k-1}^s$, which is a state at time index k−1 that transits to the current state $s_k$ with lowest branch metric, $\hat{u}_k(s_k)$, which is the decoded bit for state $s_k$, $s_k^{min}$, which is the state that has the minimum path metric (e.g., accumulated path metrics) at time index k, packet length L, and $\hat{u}_{k-TL}(s_{k-TL}^{TB})$, which are the decoded bits associated with the state at time index k−TL on the traceback path. Modified Viterbi decoder 1133 also generates preliminary decoded bits voi[k], which are based on the decoded bit corresponding to the state having the minimum path metric at index k (i.e., $\hat{u}_k(s_k^{min})$). Modified Viterbi decoder 1133 and the associated pseudocode can be adapted for different preliminary traceback lengths and encoding schemes.

In the illustrated embodiments, modified Viterbi decoder 1133 generates a conventional Viterbi decoder output vo[k] corresponding to $y_c$[k] after TL symbol times and generates a preliminarily decoded symbol voi[k] corresponding to $y_c$[k] after PTL symbol times (e.g., in the same symbol time where PTL=0). However, in other embodiments, PTL is greater than zero but is less than TL and the latency of a reference signal generated by decision circuit 1121 and the complexity of the corresponding Kalman filter based phase-locked loop increases with increases to PTL to account for predicting for PTL samples ahead. In an embodiment, a modified Viterbi decoder provides both conventional Viterbi decoder output signal vo[k] and preliminarily decoded signal voi[k] in parallel to reuse circuitry and to reduce circuit area and power consumption. In other embodiments, modified Viterbi decoder 1133 is separate from Viterbi decoder 1131, which is a conventional Viterbi decoder. In those embodiments, modified Viterbi decoder 1133 generates only preliminarily decoded symbol voi[k] or generates both preliminarily decoded signal voi[k] and a redundant version of Viterbi decoder output signal vo[k], which is discarded or used for diagnostic purposes. Use of preliminarily decoded signal voi[k] in embodiments of FIGS. 13A and 13B introduces some loss as compared to the ideal re-encoding-based approach of FIG. 12. However, in at least some embodiments, the performance of the simplified decision reference signal computation of FIGS. 13A-13D, which use preliminarily decoded symbols, approximates the ideal re-encoding-based reference signal computation of FIG. 12, and improves receiver performance of a Kalman filter based phase-locked loop as compared to its performance using the slicer-based reference signal of FIGS. 6A and 6B.

While the receiver trains using predetermined received symbols (e.g., sixteen predetermined Access Address symbols), Kalman filter based phase-locked loop 508 uses the predetermined received symbols as the reference signal and ignores the corresponding outputs of decision circuit 1121, which are the least reliable outputs of decision circuit 1121. Shortly after the receiver completes training based on the predetermined received symbols, Kalman filter based phase-locked loop 508 starts to use preliminarily decoded symbols to generate the reference signal and will have a negligible or slight performance improvement as compared to the performance when using a slicer-based reference signal. However, as Kalman filter based phase-locked loop 508 continues to use preliminarily decoded symbols to generate the reference signal, path metrics of the Viterbi algorithm accumulate, the reliability of preliminarily decoded symbols approaches the reliability of conventional Viterbi decoder outputs, and the performance of the receiver using preliminarily decoded symbols to generate the reference signal approaches the performance of the receiver using the output of a conventional Viterbi decoder to generate the reference signal.

Figure 14:
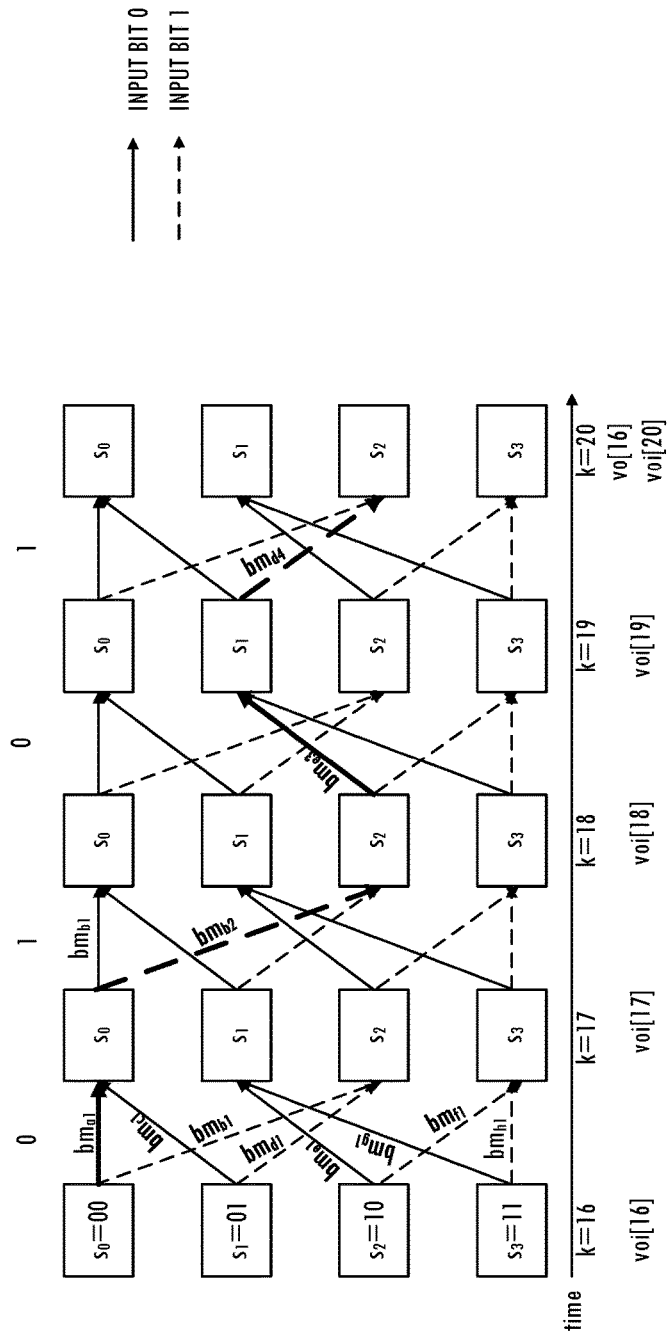
FIG. 14 illustrates a trellis diagram for an exemplary Viterbi decoder or an exemplary modified Viterbi decoder consistent with at least one embodiment of the invention.
Figure 15:
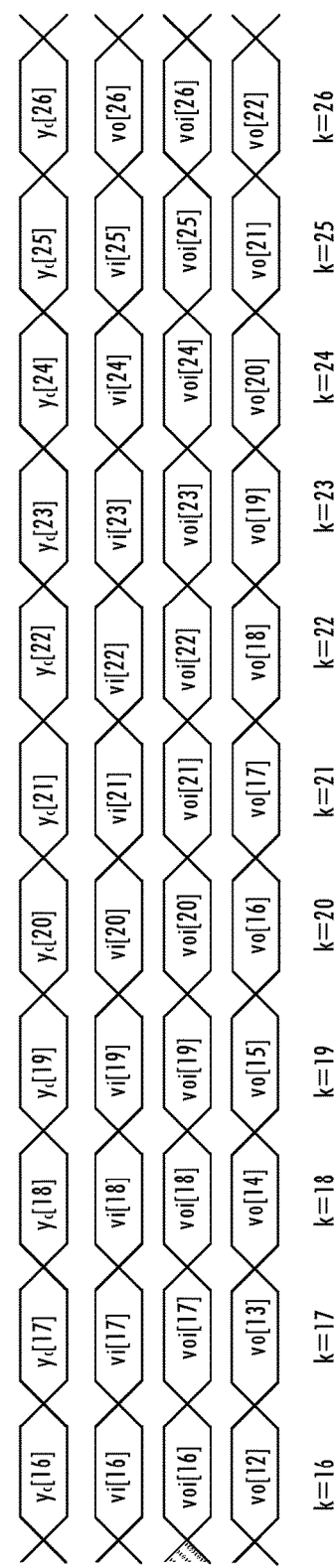
FIG. 15 illustrates exemplary timing diagrams for an exemplary modified Viterbi decoder having a traceback length of four and a modified Viterbi decoder having a preliminary traceback length of zero consistent with at least one embodiment of the invention.

FIGS. 14 and 15 illustrate an exemplary trellis diagram for Viterbi decoding of data convolutionally encoded using a non-recursive rate ½ code with constraint length K=4. For illustration purposes, TL=4. If any two paths in the trellis merge to a single state, the Viterbi decoder or modified Viterbi decoder eliminates one of them in the search for an optimum path. In the exemplary embodiment, the Viterbi decoder selects the path at time $t_i$ with the minimum Euclidian distance between an expected decision value and a received decision value. However, in other embodiments (e.g., where the Viterbi decoder receives outputs of a hard decision), the Viterbi decoder selects the path using different path metrics, e.g., selects the lowest cumulative path metric at time $t_i$. If two paths are equal, the Viterbi decoder selects a path arbitrarily. At each time $t_i$, there are $2^{K-1}$ states in the trellis, where K is the constraint length. The tree structure of the trellis diagram repeats after K branchings. The state of a rate of 1/p convolutional encoder that generated the transmitted signal is defined as the contents of the rightmost K−1 stages and there are p coded bits for each input group of k message bits. In a typical convolutional coder, k=1.

From time $0 \leq t \leq 15$, the receiver trains on the predetermined received sequence of symbols (e.g., sixteen predetermined Access Address symbols), but the preliminarily decoded signal voi[k] is ignored by phase detector of the Kalman filter based phase-locked loop. At time t=16, the receiver has completed training based on the predetermined received sequence of symbols and receives the first unknown symbol. In state $s_0$, the Viterbi decoder or modified Viterbi decoder computes branch metrics and accumulated path metrics based on soft-decision signal vi[k]. Viterbi decoder output symbols vo[16], vo[17], vo[18], and vo[19] are determined by computing the minimum path metric generated by accumulating branch metrics for each state transition from the initial state of $s_0$. In this example, the path having a minimum path metric is bolded and is the sum of $bm_{a1}$, $bm_{b2}$, $bm_{c3}$, and $bm_{d4}$. Solid lines indicate a state transition in response to a received bit of vi[k]='0' and dashed lines indicate a state transition in response to a received bit of vi[k]='1'. A symbol time t=20, where/ corresponds to a symbol time, the Viterbi decoder identifies that minimum path, which identifies decoded outputs vo[16]=0, vo[17]=1, vo[18]=0, and vo[19]=1.

Modified Viterbi decoder provides preliminarily decoded symbol voi[0] for PTL=0 based on the minimum path metric determined by comparing branch metrics $bm_{a1}$ and $bm_{b1}$ for a decoder having an initial state of so at time/=16 and transitioning to a next state at time t=17. Preliminarily decoded symbol voi[16] is available at symbol time t=16 since the processing delay is negligible as compared to symbol delay. The next preliminarily decoded symbol voi [17] corresponds to the minimum path metric at symbol time t=17. The modified Viterbi decoder continues to accumulate path metrics until reaching TL but provides a preliminarily decoded symbol corresponding to a preliminary decision based on a state transition for each symbol time. If a modified Viterbi decoder has PTL=1, then modified Viterbi decoder output voi[16] would be available at time t=17 and based on path metrics from the initial state to a final state (state at t=17) and the associated branch metrics. The preliminarily decoded symbols are used by a simplified decision circuit 1121 of FIGS. 13A and 13B to approximate the ideal re-encoding-based reference signal of the phase detector in the Kalman filter based phase-locked loop and improves receiver performance as compared to the slicer-based reference signal of FIGS. 6A and 6B.

Thus, techniques for improving the performance of a receiver in a wireless communications system by reducing effects of frequency or phase offset in a demodulator are disclosed. A phase-locked loop having variable gain consistent with Kalman filter theory and has faster convergence than a conventional phase-locked loop with fixed gain, improves performance of a receiver in a wireless communications system (e.g., reduces frequency or phase offset in the receiver, improves signal-to-noise ratio of the received signal and thus facilitates communications at increased information rates) in applications having data transmitted in bursts or packets (e.g., BLE). The Kalman filter based phased-locked loop may use a phase detector that generates a slicer-based reference signal or a re-encoding based reference signal. Use of a modified Viterbi decoder circuit to generate the reference signal approximates results obtained by re-encoding a signal decoded using a conventional Viterbi decoder to generate the reference signal of the Kalman filter based phased-locked loop and improves receiver performance as compared to a Kalman filter based phase-locked loop that uses a slicer-based reference signal.

The description of the invention set forth herein is illustrative and is not intended to limit the scope of the invention as set forth in the following claims. For example, while the invention has been described in an embodiment in which phase-shift keying is used, one of skill in the art will appreciate that the teachings herein can be utilized with other modulation schemes. In another example, while the invention has been described in an embodiment in which an Access Address field of a BLE packet is used, any predetermined symbols of a communications packet (e.g., training symbols) may be used.

The terms "first," "second," "third," and so forth, as used in the claims, unless otherwise clear by context, are to distinguish between different items in the claims and does not otherwise indicate or imply any order in time, location, or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for tracking frequency and phase offset in a receiver, the method comprising:
    computing an error signal based on a baseband version of a received radio frequency signal and a reference signal;
    generating an error correction signal based on a phase of the error signal and a predicted instantaneous phase signal; and
    providing a corrected baseband version of the received radio frequency signal based on the baseband version of the received radio frequency signal and the error correction signal.

2. The method as recited in claim 1 further comprising:
    generating the reference signal,
    wherein in a training mode of operation of the receiver, the reference signal is generated based on predetermined samples, and
    wherein in a tracking mode of operation of the receiver, the reference signal is generated using a decoded symbol based on the corrected baseband version of the received radio frequency signal.

3. The method as recited in claim 1 further comprising:
    processing the corrected baseband version of the received radio frequency signal using a modified Viterbi decoder; and
    generating the reference signal based on a preliminarily decoded symbol provided by the modified Viterbi decoder.

4. The method as recited in claim 3 further comprising:
    providing a decoded symbol based on soft-decision symbols of the corrected baseband version of the received radio frequency signal and on first path metrics for a sequence of states having a traceback length TL; and
    providing the preliminarily decoded symbol by the modified Viterbi decoder based on at least one soft-decision symbol of the corrected baseband version of the received radio frequency signal and on second path metrics for a preliminary set of states having a preliminary traceback length PTL, where PTL and TL are integers, and $0 \leq PTL < TL$.

5. The method as recited in claim 3 further comprising:
    providing the preliminarily decoded symbol by the modified Viterbi decoder at time index k based on a soft-decision symbol of the corrected baseband version of the received radio frequency signal at the time index k,
    wherein the modified Viterbi decoder has a plurality of states, each of the plurality of states has a corresponding accumulated path metric, and the preliminarily decoded symbol corresponds to a state of the plurality of states having a minimum accumulated path metric at the time index k.

6. The method as recited in claim 3 wherein processing the corrected baseband version of the received radio frequency signal comprises:
    demapping the corrected baseband version of the received radio frequency signal to generate a soft-decision signal;
    decoding the soft-decision signal using the modified Viterbi decoder to generate the preliminarily decoded symbol; and
    generating the reference signal comprising:
        convolutional encoding the preliminarily decoded symbol to generate an encoded symbol; and
        mapping the encoded symbol using a predetermined modulation scheme.

7. The method as recited in claim 1 wherein generating the error correction signal comprises:
    generating a phase difference signal based on the phase of the error signal and a prior value of the predicted instantaneous phase signal; and
    combining a proportional version of the phase difference signal with an integrated version of the phase difference signal to generate a predicted frequency signal.

8. The method as recited in claim 7 wherein generating the error correction signal further comprises:
    integrating the predicted frequency signal to generate the predicted instantaneous phase signal.

9. The method as recited in claim 1 further comprising:
    generating the reference signal,
    wherein in a tracking mode of operation of the receiver, the reference signal is generated using a feedback signal based on the corrected baseband version of the received radio frequency signal.

10. A wireless communications device comprising:
    a receiver comprising:
        a phase detector configured to provide an error signal generated based on a baseband version of a received radio frequency signal and an expected transmitted data signal;

a phase-locked loop configured to generate an error correction signal based on a phase of the error signal and a predicted instantaneous phase of the error signal; and a correction circuit configured to provide a corrected baseband version of the received radio frequency signal based on the baseband version of the received radio frequency signal and the error correction signal.

11. The wireless communications device as recited in claim 10 wherein the receiver further comprises:

a re-encoding-based processing circuit configured to provide the expected transmitted data signal based on a preliminarily decoded symbol; and a modified Viterbi decoder having a preliminary traceback length of PTL and a traceback length TL, the modified Viterbi decoder being configured to provide the preliminarily decoded symbol based on at least soft-decision symbols of the corrected baseband version of the received radio frequency signal and on path metrics for a preliminary set of states, where PTL and TL are integers, and 0≤PTL<TL.

12. The wireless communications device as recited in claim 11 wherein the re-encoding-based processing circuit comprises:

a convolutional encoder configured to generate an encoded symbol based on the preliminarily decoded symbol; and a mapping circuit configured to map the encoded symbol to the expected transmitted data signal using a predetermined modulation scheme.

13. The wireless communications device as recited in claim 10 wherein the receiver further comprises:

a re-encoding-based processing circuit configured to provide the expected transmitted data signal based on a preliminarily decoded symbol; and a modified Viterbi decoder configured to provide the preliminarily decoded symbol at time index k based on a soft-decision symbol of the corrected baseband version of the received radio frequency signal at the time index k, wherein the modified Viterbi decoder has a plurality of states, each of the plurality of states has a corresponding accumulated path metric, and the preliminarily decoded symbol corresponds to a state of the plurality of states having a minimum accumulated path metric at the time index k.

14. The wireless communications device as recited in claim 10 wherein the phase-locked loop comprises:

a phase difference circuit configured to generate a phase error signal based on a phase of the error signal and the predicted instantaneous phase of the error signal;

a proportional integral time-invariant controller responsive to the phase error signal; and an integrator configured to generate the predicted instantaneous phase of the error signal based on an output of the proportional integral time-invariant controller.

15. A method for recovering data tracking frequency and phase offset in a receiver, the method comprising:

generating a recovered signal based on error between a reference signal and a baseband version of a received radio frequency signal; and generating the reference signal based on a preliminary decision of a modified Viterbi decoder, wherein generating the recovered signal comprises:

correcting the baseband version of the received radio frequency signal using an estimate of the frequency and phase offset generated by a Kalman filter based phase-locked loop.

16. The method as recited in claim 15 further comprising:

providing a plurality of decoded symbols based on soft-decision symbols of the recovered signal and on first path metrics for a sequence of states having a traceback length TL; and providing a preliminarily decoded symbol by the modified Viterbi decoder according to the preliminary decision, the preliminary decision being based on at least one soft-decision symbol of the recovered signal and on second path metrics for a preliminary set of states, the modified Viterbi decoder having a preliminary traceback length PTL, where PTL and TL are integers, and 0≤PTL<TL, wherein the reference signal is generated based on the preliminarily decoded symbol.

17. The method as recited in claim 15 further comprising:

providing a preliminarily decoded symbol by the modified Viterbi decoder at time index k according to the preliminary decision, the preliminary decision being based on a soft-decision symbol of the recovered signal at the time index k, wherein the modified Viterbi decoder has a plurality of states, each of the plurality of states has a corresponding accumulated path metric, and the preliminarily decoded symbol corresponds to a state of the plurality of states having a minimum accumulated path metric at the time index k, wherein the reference signal is generated based on the preliminarily decoded symbol.

18. The method as recited in claim 15 wherein generating the recovered signal comprises:

training the Kalman filter based phase-locked loop using a predetermined code as the reference signal in a first mode of operating the receiver; and tracking the frequency and phase offset using the Kalman filter based phase-locked loop in a second mode of operating the receiver.

19. The method as recited in claim 18 wherein the tracking comprises:

computing the estimate of the frequency and phase offset based on the baseband version of the received radio frequency signal and a corrected baseband version of the received radio frequency signal based on a prior estimate of the frequency and phase offset.

20. The method as recited in claim 15 wherein generating the reference signal using a preliminarily decoded symbol provided by the modified Viterbi decoder comprises:

encoding the preliminarily decoded symbol using convolutional encoding to generate an encoded preliminarily decoded symbol; and mapping the encoded preliminarily decoded symbol using a predetermined modulation scheme to generate the reference signal.

* * * * *